(12) United States Patent
Edwards

(10) Patent No.: US 9,016,510 B2
(45) Date of Patent: Apr. 28, 2015

(54) DRINKING GLASS HOLDING APPARATUS

(71) Applicant: Carolina Edwards, Chula Vista, CA (US)

(72) Inventor: Carolina Edwards, Chula Vista, CA (US)

( * ) Notice: Subject to any disclaimer, the term of this patent is extended or adjusted under 35 U.S.C. 154(b) by 108 days.

(21) Appl. No.: 13/932,459

(22) Filed: Jul. 1, 2013

(65) Prior Publication Data

US 2015/0001233 A1 Jan. 1, 2015

(51) Int. Cl.
*A47G 23/02* (2006.01)
*B60N 3/10* (2006.01)

(52) U.S. Cl.
CPC ............ *A47G 23/02* (2013.01); *A47G 23/0225* (2013.01); *B60N 3/106* (2013.01)

(58) Field of Classification Search
CPC ... A47G 19/06; A47G 19/02; A47G 23/0225; A47G 23/0216; A47G 23/0208; A47G 23/02; B60N 3/106; B60N 3/105; B60N 3/103; B60N 3/10

USPC ........... 220/574.1, 574, 737, 735, 694; 206/564, 563, 562; D7/396.2, 396.1; 248/313, 311.2, 309.1

See application file for complete search history.

(56) References Cited

U.S. PATENT DOCUMENTS

| 3,314,635 | A | * | 4/1967 | Frye | 248/311.2 |
| 5,419,455 | A | * | 5/1995 | Russeau | 220/575 |
| 8,136,667 | B2 | * | 3/2012 | Raynor | 206/563 |
| 2008/0169408 | A1 | * | 7/2008 | Berman et al. | 248/558 |
| 2010/0078350 | A1 | * | 4/2010 | Raynor | 206/564 |

* cited by examiner

*Primary Examiner* — Robert J Hicks
(74) *Attorney, Agent, or Firm* — Dale J. Ream

(57) ABSTRACT

A drinking glass holding apparatus for holding a glass relative to a plate includes a body member having opposed first and second ends. A first clamping assembly is operatively coupled to the body member first end and includes an upper plate pivotally coupled to a lower plate and movable between a closed configuration at which distal ends thereof bear against one another and an open configuration at which the distal ends thereof are displaced from one another. A second clamping assembly is operatively coupled to the second end of the body member and includes a first portion pivotally coupled to a second portion and movable between a closed configuration at which distal ends thereof are proximate one another and an open configuration at which the distal ends are displaced from one another.

11 Claims, 5 Drawing Sheets

DRINKING GLASS HOLDING APPARATUS

BACKGROUND OF THE INVENTION

This invention relates generally to dinnerware, glassware, and party supplies and, more particularly, to a drinking glass holding apparatus specifically configured to hold a drinking glass to a food plate.

Parties and special event receptions often include serving food and drink items that are then consumed by guests who are standing and mingling with one another. In other words, there may be only a few tables or chairs such that guests are forced to manage a plate of appetizers and a glass of a beverage. A significant problem in this situation is that holding the plate with one hand and the drink with the other hand makes it very difficult to actually consume the food on the plate. Not only is consumption of food and drinks difficult in this circumstance, but being able to answer a cell phone call or text message is all but impossible. One practical—but undesirable—solution to this problem is for a guest to consume the food entirely prior to obtaining a beverage.

Therefore, it would be desirable to have a drinking glass holding apparatus that couples the beverage container directly to the plate. With this device in place, the drinking glass may be stowed in the holder while eating food on the plate using the free hand or a utensil and then grasping the glass with the free hand as desired. Further, it would be desirable to have a drinking glass holding apparatus having a first clip to attach to the plate and a second clip to grasp the drinking glass.

SUMMARY OF THE INVENTION

A drinking glass holding apparatus for holding a glass and selectively coupling the glass to a plate includes a body member having a first end and an opposed second end. A first clamping assembly is operatively coupled to the first end of the body member, the first clamping assembly having an upper plate pivotally coupled to a lower plate and movable between a closed configuration at which distal ends of the upper plate and the lower plate, respectively, bear against one another and an open configuration at which the distal ends of the upper plate and the lower plate, respectively, are displaced from one another. A second clamping assembly is operatively coupled to the second end of the body member, the second clamping assembly having a first portion pivotally coupled to a second portion and movable between a closed configuration at which distal ends of the first portion and the second portion, respectively, are proximate one another and an open configuration at which the distal ends of the first portion and the second portion, respectively, are displaced from one another.

Therefore, a general object of this invention is to provide a drinking glass holding apparatus for clipping a drinking glass to a plate and, as a result, enable a person to hold both the plate and glass with a single hand.

Another object of this invention is to provide a drinking glass holding apparatus, as aforesaid, having a first clamping assembly configured for attachment to a plate and a second clamping assembly configured to hold a glass.

Still another object of this invention is to provide a drinking glass holding apparatus, as aforesaid, in which the first clamping assembly includes upper and lower plates pivotally movable between open and closed configurations so as to be securely coupled to an edge of a plate.

Yet another object of this invention is to provide a drinking glass holding apparatus, as aforesaid, in which the second clamping assembly includes first and second portions that may be selectively separated by urging a glass against distal ends of the portions.

A further object of this invention is to provide a drinking glass holding apparatus, as aforesaid, that is easy to use.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 3b is a sectional view taken along line 3b-3b of FIG. 3a;

FIG. 4b is a sectional view taken along line 4b-4b of FIG. 4a;

DESCRIPTION OF THE PREFERRED EMBODIMENT

Figure 1:
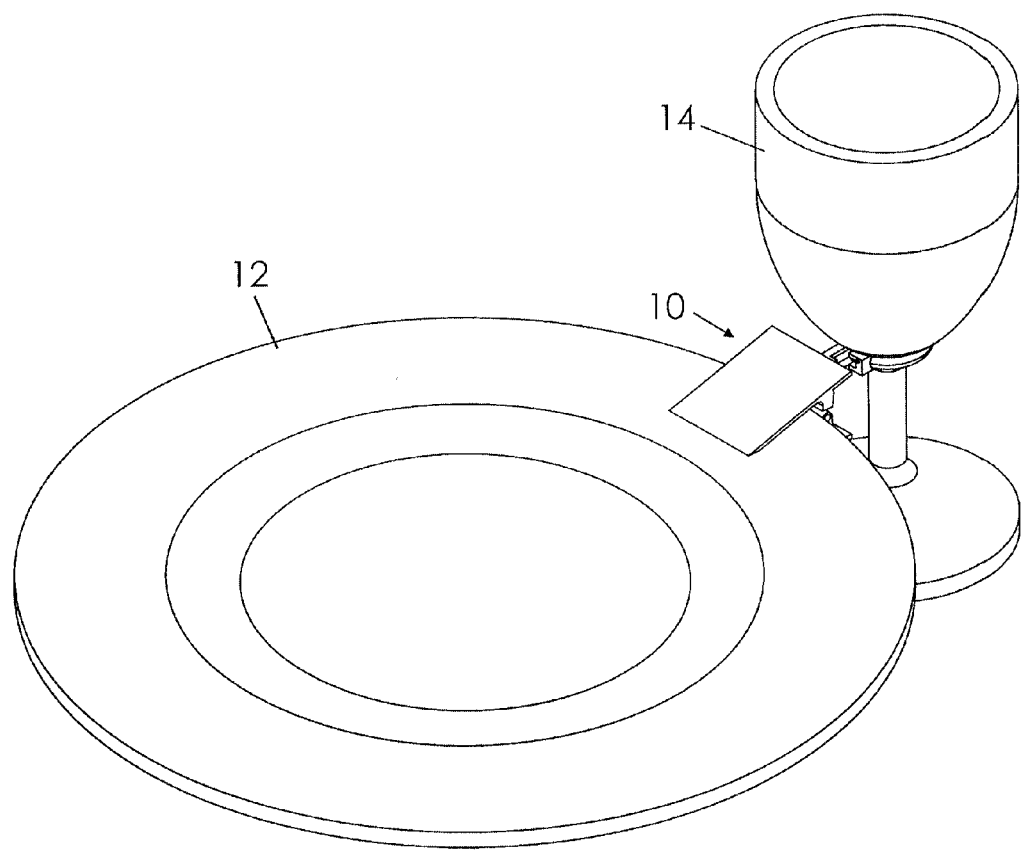
FIG. 1 is a perspective view of a drinking glass holding apparatus according to a preferred embodiment of the present invention illustrated in use with a food plate and a drinking glass.
Figure 2:
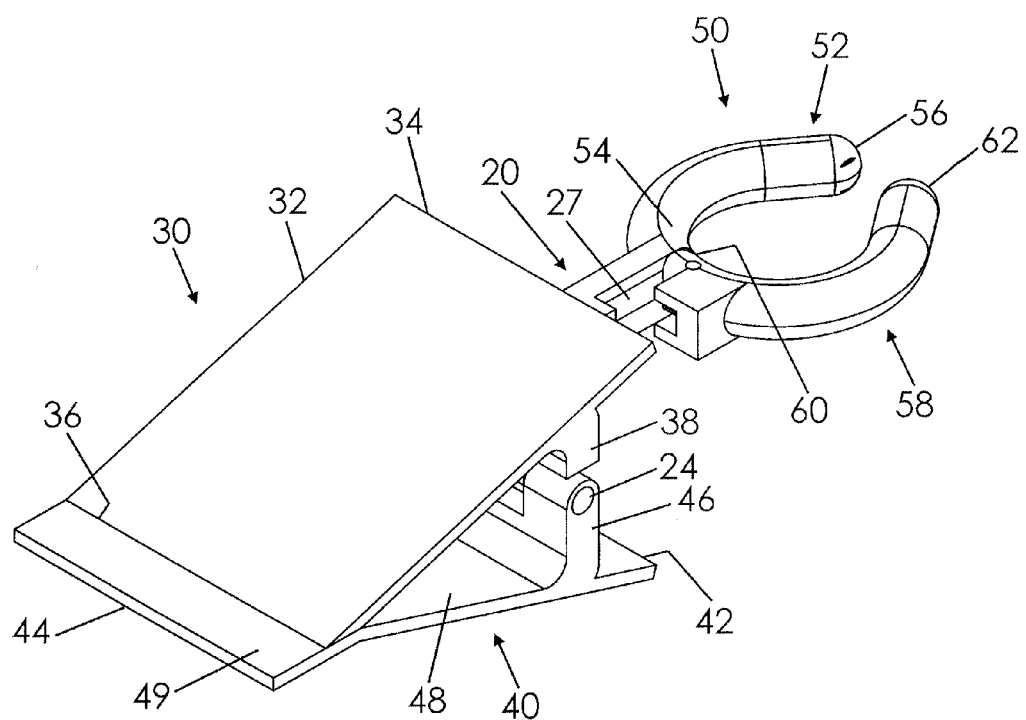
FIG. 2 is a perspective view of the glass holding apparatus as in FIG. 1 with the plate and glass removed.

A drinking glass holding apparatus according to a preferred embodiment of the present invention will now be described in detail with reference to FIGS. 1 to 5 of the accompanying drawings. The drinking glass holding apparatus 10 includes a first clamping assembly 30 and a second clamping assembly 50 extending from opposite ends of a body member 20.

The body member 20 includes a first end 22 and an opposed second end 26 and includes a generally linear configuration that defines an imaginary longitudinal axis. The body member 20 includes a length that defines the distance that a drinking glass is held away from a plate as will become clear by the following description. Both the first clamping assembly 30 and the second clamping assembly 50 are aligned and situated along the longitudinal axis of the body member 20. The first end 22 of the body member 20 may include a mounting rod 24 that defines a horizontal axis. In other words, the mounting rod 24 is generally perpendicular to the longitudinal axis defined by the body member 20. The mounting rod 24 may be fixedly attached to the first end 22 or may have a unitary construction therewith.

The first clamping assembly 30 is coupled to the first end 22 of the body member 20. The first clamping assembly 30 includes an upper plate 32 pivotally coupled to a lower plate 40 and movable between closed and open configurations. At the closed configuration, distal ends 36, 44 of upper plate 32 and lower plate 40, respectively, bear against one another (or are separated only by a food plate 12 to which the plates are coupled. At the open configuration, distal ends 36, 44 of upper plate 32 and lower plate 40, respectively, are displaced from one another. More particularly, the upper plate 32 includes an upper plate mounting member 38 pivotally coupled to the mounting rod 24 so as to selectively pivot about the horizontal axis defined thereby. Similarly, the lower plate 40 includes a mounting member 46 pivotally coupled to the mounting rod 24 so as to selectively pivot about the horizontal axis defined thereby. The distal ends 36, 44 of the upper 32 and lower 40 plate, respectively, are displaced away from the first end 22 of the body member 20. In other words, the distal ends 36, 44 open in a direction away from the body member 20.

Movement from the closed configuration to the open configuration is caused by a movement of proximal ends 34, 42 of the upper 32 and lower 40 plates toward one another, respectively. The upper 32 and lower 40 plates are counter-rotating about the mounting rod 24 so as to cause the distal ends 36, 44 to open in a scissor-type operation. Movement from the open configuration to the closed configuration is automatic when the proximal ends 34, 42 are no longer urged together. Specifically, the first clamping assembly 30 is normally biased toward the closed configuration by a torsion spring 47. The torsion spring 47 includes ends that are connected to respective mounting members 38, 46 so as to normally rotate them and the plates 32, 40 connected thereto toward the closed configuration.

Figure 3A:
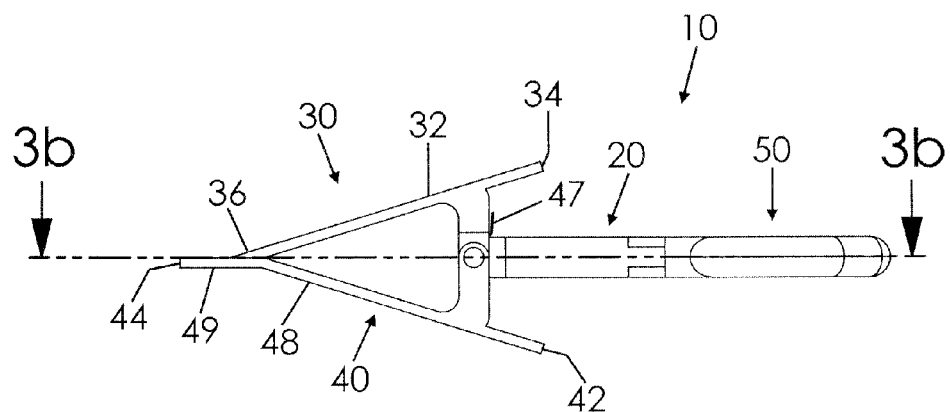
FIG. 3a is a side view of the glass holding apparatus as in FIG. 2 shown in a closed configuration.

The upper 32 and lower 40 plates of the first clamping assembly 30 include a generally planar configuration. In one embodiment, the lower plate 40 may have a modified configuration. Namely, the lower plate 40 may include a length that is greater than a length of the upper plate 32. The lower plate 40 may include a main portion 48 coupled to the first end 22 of the body member 20 as described above and an end portion 49 offset from the main portion 48. As shown in FIG. 3a, the offset end portion 49 is preferably horizontal and thus complementary to the bottom surface of a food plate 12.

The second clamping assembly 50 includes a first portion 52 and a second portion 58 operatively and pivotally coupled to the first portion 52. The second end 26 of the body member 20 includes a mounting flange 28 that defines a vertical axis. The first portion 52 may include a proximal end 54 that is fixedly attached to the mounting flange 28 or, in one embodiment, may include a unitary construction therewith. The second end 26 of the body member 20 may include a recessed ledge 27 that includes the mounting flange 28. A proximal end 60 of the second portion 58 may be pivotally coupled to the mounting flange 28, such as with a pin 29, so as to selectively pivot about the vertical axis. The proximal end 60 of the second portion 58 may be configured to extend atop the recess ledge 27 and flange 28. In another embodiment (not shown), the proximal end 60 and mounting flange 28 may include a nub/recess combination to establish the pivotal coupling about the vertical axis.

The first portion 52 of the second clamping assembly 50 includes an outwardly annular configuration. Similarly, the second portion 58 of the second clamping assembly 50 includes an outwardly annular configuration. Preferably, each portion includes a generally tubular construction. Together, the first 52 and second 58 portions are configured to surround a drinking glass such that the liquid receptacle portion of the drinking glass 14 may rest atop the first 52 and second 58 portions (FIG. 1).

Figure 3B:
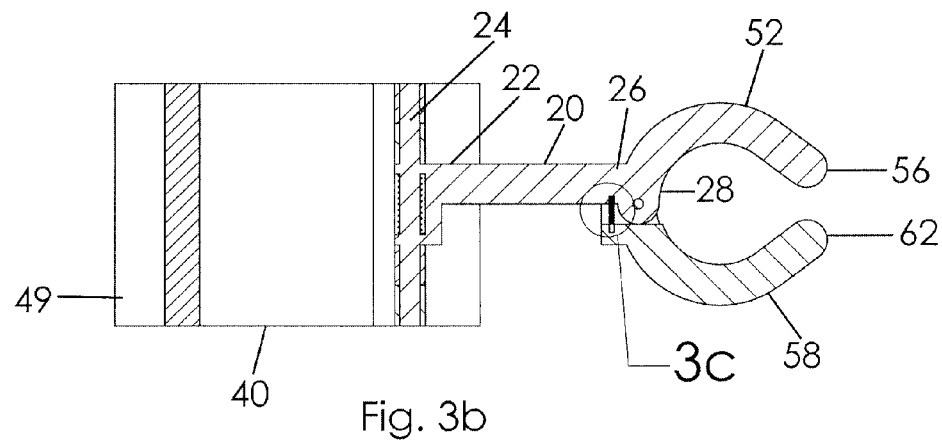
Figure 4A:
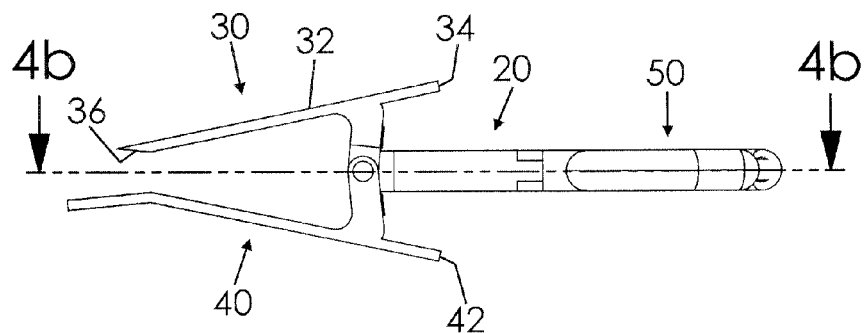
FIG. 4a is a side view of the glass holding apparatus as in FIG. 2 shown in an open configuration.
Figure 4B:
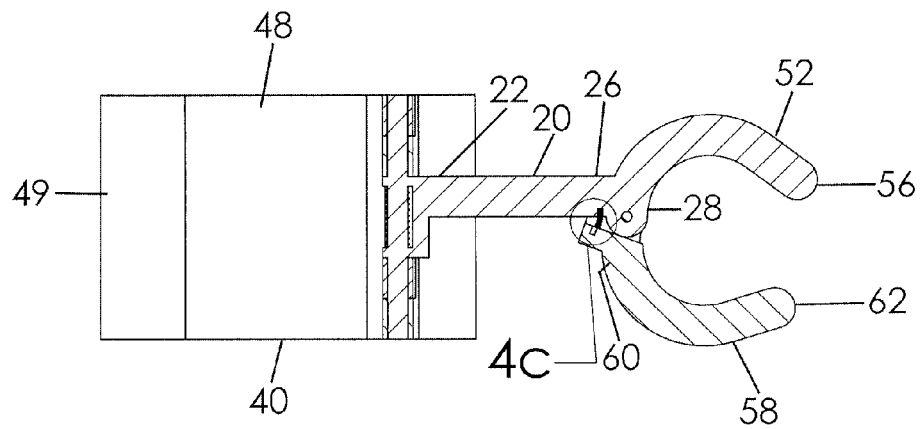

The second clamping assembly 50 is pivotally movable between a closed configuration in which distal ends 56, 62 of the first 52 and second 58 portions, respectively, are proximate or bear against one another and an open configuration in which distal ends 56, 62 of the first 52 and second 58 portions, respectively, are displaced from one another. The distal ends 56, 62 of the first 52 and second 58 portions, respectively, are displaced away from the second end 26 of the body member 20. In other words, the distal ends 56, 62 open in a direction away from the body member 20 and in a direction opposite the distal ends 36, 44 of the first clamping assembly 30. Pressure against the distal ends 56, 62 causes the second portion 58 to pivot and to be displaced from the first portion 52 (FIG. 4b). In use, the pressure of the receptacle portion of a drinking glass 14 will cause the distal ends 56, 62 to separate. Movement from the open configuration to the closed configuration is automatic in that the second clamping assembly 50 is normally biased toward the closed configuration (FIG. 3b).

Figure 3C:
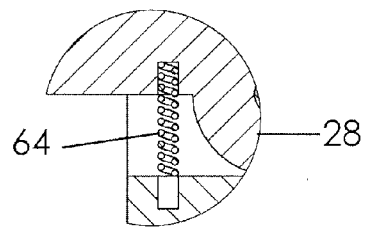
FIG. 3c is an isolated view on an enlarged scale taken from FIG. 3b.
Figure 4C:
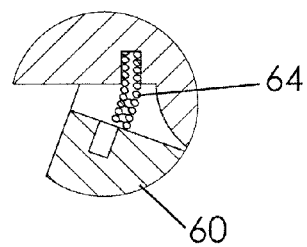
FIG. 4c is an isolated view on an enlarged scale taken from FIG. 4b.
Figure 5:
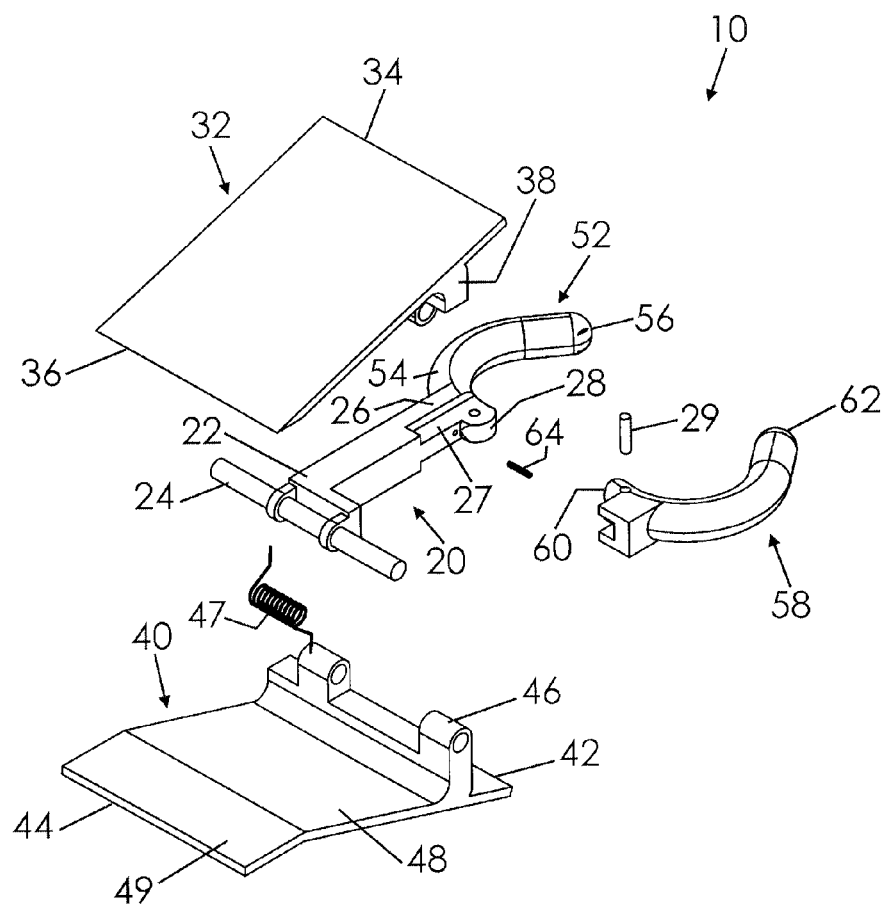
FIG. 5 is an exploded view of the glass holding apparatus as in FIG. 2.

Specifically, the second clamping assembly 50 includes a compression spring 64 extending between the first 52 and second 58 portions. When the first 52 and second 58 portions are moved to the open configuration, the compression spring 64 is compressed (FIGS. 4b and 4c). When the pressure that urges movement to the open configuration is removed, the compression spring 64 urges the second portion 58 to return to the closed configuration (FIGS. 3b and 3c).

In use, the first clamping assembly 30 may be coupled to an edge of a food plate 12 as shown in FIG. 1. Specifically, the proximal ends 34, 42 of the upper 32 and lower 40 plates may be squeezed together such that distal ends 36, 44 thereof are pivotally moved to the open configuration while the food plate 12 is inserted therebetween. Releasing the proximal ends 34, 42 allows the torsion spring 47 to bias the first clamping assembly 30 toward the closed configuration, securing the drinking glass holding apparatus 10 to the food plate 12. Then, the second clamping device 50 may be used to secure a drinking glass 14. Specifically, the stem of a glass 14 may be pressed against the distal ends 56, 62 of the first 52 and second 58 portions of the second clamping assembly 50 which causes the second portion 58 to pivot toward the open configuration. Once the stem of the glass 14 is moved into the void defined by the outwardly annular portions, the compression spring 64 urges the first 52 and second 58 portions toward the closed configuration and the glass 14 is supported thereon.

Accordingly, the drinking glass holding apparatus 10 enables a drinking glass 14 to be secured to a food plate 12 so that a user has a free hand with which to eat and drink.

It is understood that while certain forms of this invention have been illustrated and described, it is not limited thereto except insofar as such limitations are included in the following claims and allowable functional equivalents thereof.

The invention claimed is:

1. A drinking glass holding apparatus for use with a plate and a glass, comprising:
 a body member having a first end and an opposed second end;
 a first clamping assembly operatively coupled to said first end of said body member, said first clamping assembly having an upper plate pivotally coupled to a lower plate and movable between a closed configuration at which distal ends of said upper plate and said lower plate, respectively, bear against one another and an open configuration at which said distal ends of said upper plate and said lower plate, respectively, are displaced from one another;
 a second clamping assembly operatively coupled to said second end of said body member, said second clamping assembly having a first portion pivotally coupled to a second portion and movable between a closed configuration at which distal ends of said first portion and said second portion, respectively, are proximate one another and an open configuration at which said distal ends of said first portion and said second portion, respectively, are displaced from one another.

2. The drinking glass holding apparatus as in claim 1, wherein:
said first clamping assembly includes a first spring operatively connected to said upper plate and to said lower plate, said first spring configured to normally bias said first clamping assembly toward said closed configuration; and
said second clamping assembly includes a second spring operatively connected to said first portion and to said second portion, said second spring configured to normally bias said second clamping assembly toward said closed configuration.

3. The drinking glass holding apparatus as in claim 2, wherein:
said first end of said body member includes a mounting rod defining a horizontal axis;
said upper plate includes a upper plate mounting member pivotally coupled to said mounting rod so as to pivot about said horizontal axis; and
said lower plate includes a lower plate mounting member pivotally coupled to said mounting rod so as to pivot about said horizontal axis.

4. The drinking glass holding apparatus as in claim 3, wherein:
said second end of said body member includes a mounting flange defining a vertical axis; and
a proximal end of said second portion is operatively coupled to said mounting flange so as to selectively pivot about said vertical axis.

5. The drinking glass holding apparatus as in claim 2, wherein:
said second end of said body member defines a recessed ledge that includes a mounting flange defining a vertical axis; and
a proximal end of said second portion is configured to mate with said recessed ledge and be coupled to said mounting flange so as to be pivot about said vertical axis.

6. The drinking glass holding apparatus as in claim 1, wherein:
said body member defines a longitudinal axis;
said first clamping assembly is situated along said longitudinal axis; and
said second clamping assembly is situated along said longitudinal axis.

7. The drinking glass holding apparatus as in claim 6, wherein:
said distal ends of said upper plate and said lower plate, respectively, are displaced away from said first end of said body member; and
said distal ends of said first portion and said second portion, respectively, are displaced away from said second end of said body member.

8. The drinking glass holding apparatus as in claim 1, wherein:
said first portion of said second clamping assembly includes an outwardly annular configuration; and
said second portion of said second clamping assembly includes an outwardly annular configuration.

9. The drinking glass holding apparatus as in claim 1, wherein:
said upper plate of said first clamping assembly includes a generally planar configuration; and
said lower plate of said first clamping assembly includes a generally planar configuration.

10. The drinking glass holding apparatus as in claim 9, wherein:
said lower plate includes a length that is longer than a length of said upper plate; and
said lower plate includes a main portion coupled to said first end of said body member and an end portion offset from said main portion.

11. The drinking glass holding apparatus as in claim 2, wherein:
said first spring is a torsion spring; and
said second spring is a compression spring.

* * * * *